(12) United States Patent
Cecille et al.

(10) Patent No.: US 11,837,745 B2
(45) Date of Patent: Dec. 5, 2023

(54) BATTERY STORAGE HOUSING AND EMERGENCY LOCATION TRANSMITTER

(71) Applicant: SAFRAN AEROSYSTEMS, Plaisir (FR)

(72) Inventors: Jean-Philippe Cecille, Gradignan (FR); Daniele Banfi, Faenza (IT)

(73) Assignee: SAFRAN AEROSYSTEMS, Plaisir (FR)

( * ) Notice: Subject to any disclaimer, the term of this patent is extended or adjusted under 35 U.S.C. 154(b) by 375 days.

(21) Appl. No.: 17/419,144

(22) PCT Filed: Dec. 20, 2019

(86) PCT No.: PCT/FR2019/053264
§ 371 (c)(1),
(2) Date: Jun. 28, 2021

(87) PCT Pub. No.: WO2020/136338
PCT Pub. Date: Jul. 2, 2020

(65) Prior Publication Data
US 2022/0109208 A1    Apr. 7, 2022

(30) Foreign Application Priority Data
Dec. 28, 2018   (FR) ...................................... 1874379

(51) Int. Cl.
*H01M 50/289*   (2021.01)
*H01M 50/264*   (2021.01)
(Continued)

(52) U.S. Cl.
CPC ....... *H01M 50/264* (2021.01); *H01M 50/224* (2021.01); *H01M 50/276* (2021.01); *H01M 50/289* (2021.01); *H01M 50/204* (2021.01)

(58) Field of Classification Search
CPC ............. H01M 50/264; H01M 50/224; H01M 50/276; H01M 50/289; H01M 50/204; H01M 50/24; H01M 2220/30; Y02E 60/10
See application file for complete search history.

(56) References Cited

U.S. PATENT DOCUMENTS 3,837,918 A     9/1974   Nakabayashi
2011/0260007 A1  10/2011  Adachi
(Continued)

FOREIGN PATENT DOCUMENTS

EP          3410512 A1    12/2018

OTHER PUBLICATIONS

English translation of the Written Opinion of the International Searching Authority dated May 12, 2020, issued in corresponding International Application No. PCT/FR2019/053264, filed on Dec. 20, 2019, 5 pages.
(Continued)

*Primary Examiner* — Stacy Whitmore
(74) *Attorney, Agent, or Firm* — Christensen O'Connor Johnson Kindness PLLC

(57) ABSTRACT

A cell storage box for storing a battery cell includes a first end provided with a safety valve and a second end. The cell storage box includes a metal case having a bottom wall and side walls, and a thermally insulating support arranged in the metal case. The thermally insulating support includes a shoulder raised relative to the bottom wall of the metal case, a side bearing wall configured such that the cell rests against the at least one side bearing wall so as to keep the cell at a first distance from the at least one side wall of the metal case, and an opening arranged below the shoulder in order to allow smoke and gas to escape during a runaway of the cell.

10 Claims, 5 Drawing Sheets

(51) Int. Cl.
*H01M 50/276* (2021.01)
*H01M 50/224* (2021.01)
H01M 50/204 (2021.01)

(56) References Cited

U.S. PATENT DOCUMENTS

2012/0288738 A1   11/2012   Yasui et al.
2016/0204404 A1    7/2016   Shimzu et al.
2018/0358671 A1   12/2018   Halsey et al.

OTHER PUBLICATIONS

International Search Report dated May 12, 2020, issued in corresponding International Application No. PCT/FR2019/053264, filed on Dec. 20, 2019, and its English translation thereof, 5 pages.
Written Opinion of the International Searching Authority dated May 12, 2020, issued in corresponding International Application No. PCT/FR2019/053264, filed on Dec. 20, 2019, 5 pages.

BATTERY STORAGE HOUSING AND EMERGENCY LOCATION TRANSMITTER

CROSS-REFERENCES TO RELATED APPLICATIONS

This application is a National Stage of International Application No. PCT/FR2019/053264 filed Dec. 20, 2019, which claims priority to French Patent Application No. 1874379, filed Dec. 28, 2018, the entire disclosures of which are hereby incorporated by reference.

FIELD OF THE INVENTION

The invention is from the field of batteries and cell storage boxes, in particular for lithium cell storage. The invention also relates to emergency location transmitters used in the aerospace field.

DESCRIPTION OF RELATED ART

Several accidents have occurred due to the thermal runaway of primary and secondary lithium cells. Thermal runaway of cells can create significant damage to aircraft. To avoid this damage, positioning the devices containing lithium cells in specific fabric bags or in boxes suited for containing the flames and the heat is known. The document US 2018/0358671 describes a battery pack comprising a chassis defining a body for holding battery cells. The document US 2016/0204404 and the document EP 3,410,512 disclose cell storage boxes that are not specific to aeronautical requirements.

It is preferable to limit the consequences of the thermal runaway of cells for avoiding propagation of a fire.

BRIEF SUMMARY OF THE INVENTION

For this purpose, a cell storage box is proposed suited for storing at least one cell having a first end provided with a safety valve and a second end, said box comprising:
a metal case comprising a bottom wall and side walls; and
at least one thermally insulating support arranged in the case, where said support comprises:
a shoulder raised relative to the bottom wall of the case, where the first end of the cell rests on said shoulder;
at least one side bearing wall, where said at least one cell rests against said at least one side bearing wall so as to keep the cell at a first distance from the at least one side wall of the case, and where a first air gap is arranged between said side wall and said at least one cell;
at least one opening arranged below the shoulder in order to allow smoke and gases leaving the safety valve to escape during a runaway of the cell;
an enclosure made of thermally insulating material, where said enclosure forms a housing with inner dimensions greater than the outer dimensions of the case; where said case is suspended in said housing by fasteners, where a third air gap is arranged between the enclosure and the case, and where the case is in contact with said enclosure solely via said fasteners.

Advantageously, the fact of suspending the case within the enclosure serves to form a thermal insulator around the case. Consequently, the outside temperature of the enclosure will be low.

Advantageously, the one or more cells are carried raised above the bottom wall of the metal case in order to allow liquid residues leaving the safety valve to flow to the bottom of the case during a runaway of the cell.

Advantageously, the support serves to physically isolate the one or more cells from the case and to create air gaps extending around each cell. These air gaps are going to allow the evacuation of smoke and gases. These air gaps are also thermal insulators.

The characteristics disclosed in the following paragraphs may, optionally, be practiced. They may be practiced independently of each other or in combination with each other:

The support comprises a hollow lower cavity suited to receive liquid residue coming from the safety valve during runaway of the cell.

The cell storage box is intended to store at least two cells and said box comprises at least one metal separating wall positioned in the case, where said separating wall is able to delimit at least two compartments, where said at least one support is suited to carry one cell in each compartment, where the side bearing wall is able to hold the at least one cell at a second distance from said at least one separating wall, and where a first air gap is arranged between the separating wall and the cell.

The cell storage box further comprises a thermally insulating locking plate having at least one reinforcement suited to keep the second end of said at least one cell in position.

The locking plate comprises at least one hole through which smoke and gases can pass during runaway of the cell.

The box comprises a metal cover provided with at least one hole through which smoke and gases can pass during runaway of the cell.

The box comprises at least one second air gap delimited by a corner of a compartment and a part of the support arranged opposite the corner of the compartment and in which at least one hole is made above said at least one second air gap.

The shoulder is located at a height above the bottom wall of the case; the height is equal to at least 2 mm.

The invention also relates to an emergency location transmitter for aircraft comprising a cell storage box meeting the characteristics indicated above, a complementary box suited to be attached to said cell storage box, and an electronic circuit, where said electronic circuit is suited to generate a radiofrequency signal, an antenna connected to the electronic circuit for transmitting an emergency location signal with the radiofrequency signal.

In particular said complementary box is suited to be attached above said cell storage box, where the complementary box comprises openings connecting with the cell storage box.

Advantageously, the hot smoke leaving the safety valve of the cell, rises in the air gap located between the cell and the walls 46 of the case, passes through the through hole 68 and rise in the complementary box 6. When the smoke and gases are in the complementary box, they are cooled at the contacts of the electronic equipment contained in this box, such as for example the electronic card.

BRIEF DESCRIPTION OF THE DRAWINGS

Other features, details and advantages of the invention will appear upon reading the following detailed description, and upon analysis of the attached drawings, on which.

DETAILED DESCRIPTION OF INVENTION

The following drawings and description contain, for the most part, items of some kind. They may therefore not only serve to better understand the present invention, but also contribute to the definition thereof, as needed.

Conventionally, in the description which follows, the terms "lower," "upper," "above," "below" are defined when the cell storage box 4 according to the invention and the transmitter according to the invention are arranged as shown in the figures, and are in no way limiting.

Figure 1:
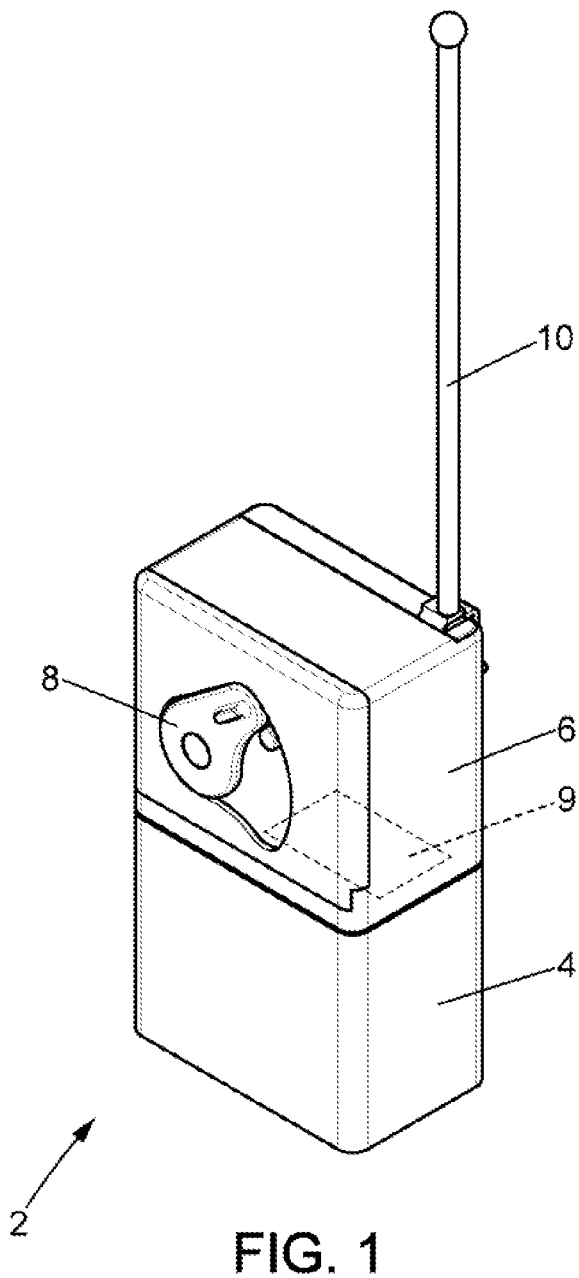
FIG. 1 is a perspective view of an emergency location transmitter according to the present invention.

Referring to FIG. 1, the invention relates to a cell storage box 4 and an emergency location transmitter 2 which comprises the cell storage box and a complementary box 6 of the kind to be attached above the cell storage box 4.

The complementary box 6 comprises a lever 8 for triggering a location signal, an electronic circuit 9 connected to the triggering lever 8 and an antenna 10 connected to the electronic circuit 9. The triggering lever 8 is, for example, mounted pivoting on the complementary box 6. The electronic circuit 9 may be housed in the complementary box 6 as in the embodiment shown. The antenna 10 is for example attached onto the complementary box.

When the triggering lever 8 is pivoted, the electronic circuit 9 is suited for generating a radiofrequency signal. The antenna 10 is able to transmit an emergency location signal with the radiofrequency signal.

The cell storage box 4 according to the present invention is intended to receive one or more cells 12. These cells are for example primary or secondary lithium cells. According to the present invention, these cells may or may not be electrically connected to each other so as to form a battery. The electrical connection of the cells to electricity consuming equipment or possible connections between the cells themselves are not part of the present patent application and have not been shown on the figures.

In the example shown in the figures, the cells 12 have a cylindrical shape with the first end 14 provided with a safety valve 16 and a second end 18 opposite the first end. This shape is in no way limiting, the present invention also applies to cells having another shape. The safety valve 16 is a safety device allowing the escape of smoke and gases and liquid residues in the case of excess pressure in the cell or runaway of the cell. It is for example formed by a vent which may be equipped with a ball-check valve or a rupture disk.

An example of a storage box 4 comprising eight cells 12 is described and illustrated in the figures. The invention also applies to a storage box 4 comprising a different number of cells. This number may be greater than or equal to one.

Figure 2:
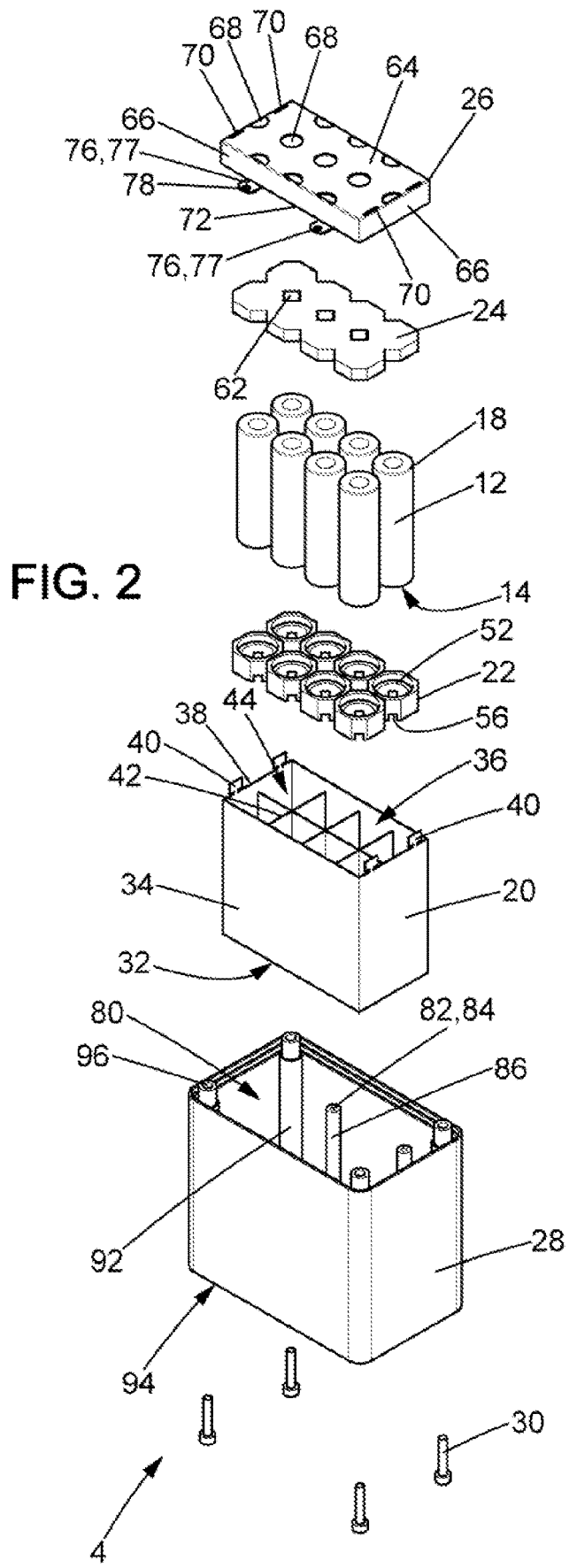
FIG. 2 is an exploded perspective view of a cell storage box according to the present invention.

As shown in FIG. 2, the storage box 4 comprises a metal case 20, eight thermally insulating supports 22 suited to carry one cell 12 each, a thermally insulating locking plate 24 suited to be mounted above eight cells 12 and a metal cover 26 suited to be mounted on the locking plate 24 and to be fixed to the case 20.

Figure 7:
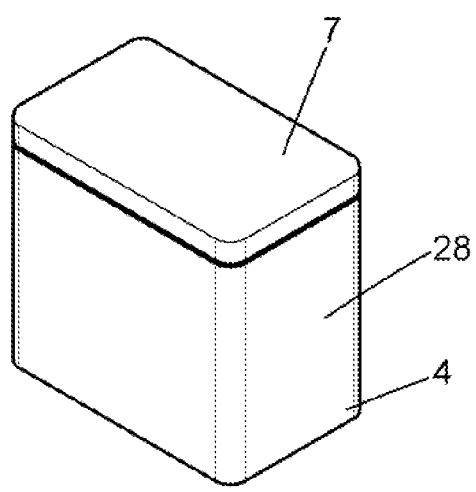
FIG. 7 is a perspective view of a cell storage box according to the present invention with a top mounted on the box.

The box 4 also comprises an enclosure 28 receiving the case 20, the supports 22, the plate 24, the cover 26 and the attachment elements 30 for attaching the enclosure 28 to the complementary box 6 shown on FIG. 1 or to a top 7 shown on FIG. 7.

The case 20 has a general rectangular parallelepiped shape. It has a bottom wall 32 and side walls 34. The upper surface thereof 36 is open. The upper edge 38 of these side walls have two metal tabs 40 extending vertically in projection.

In the embodiment shown, the case 20 further comprises metal separating walls 42 extending vertically in the case. In the example shown, the case 20 comprises three transverse separating walls 42 and one longitudinal and central separating wall 42. These walls 42 delimit eight compartments 44. Each compartment 44 is intended to store one cell support 22 and one cell 12.

Advantageously, the separating walls 42 serve to isolate the cells 12 from each other. Also advantageously, the separating walls 42 are suited to absorb a portion of the heat released by a cell 12 during runaway thereof.

Each compartment 44 has an inner dimension greater than the outer dimension of the cell 12. A first distance D1 at least greater than 0.5 mm separates each cell 12 from a side wall 34 of the case. A second distance D2 at least greater than 0.5 mm separates each cell 12 from a separating wall 42. Preferably, the first or second distance is equal to 1 mm. The first distance and second distance can be equal or different. A first air gap 46 is thus arranged between each cell and a side wall 34. A first air gap 46 is also provided between each cell 12 and a separating wall 42. These first air gaps 46 form thermal insulation and allow the removal of smoke and gases in case of runaway of a cell.

Figure 4:
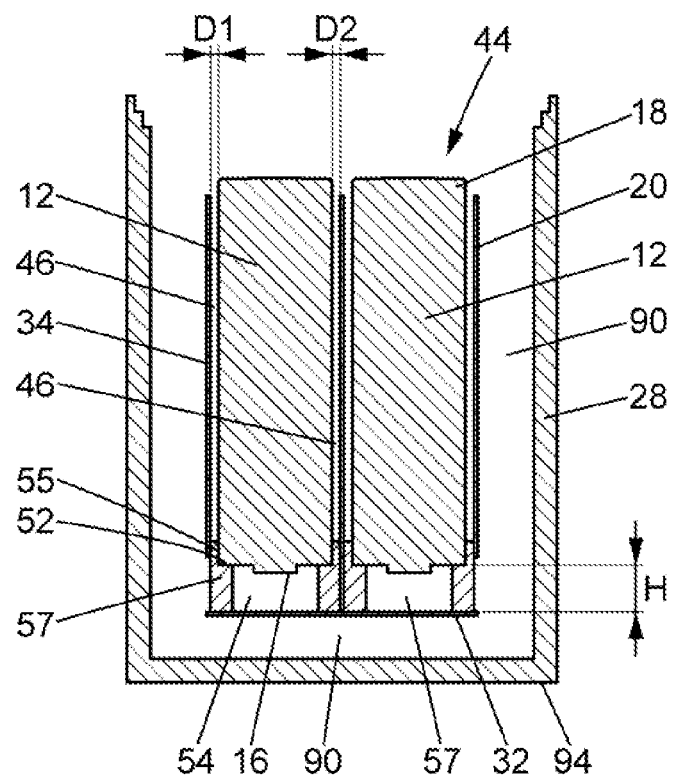
FIG. 4 is a section of the cell storage box along the section plane IV-IV shown in FIG. 3.
Figure 5:
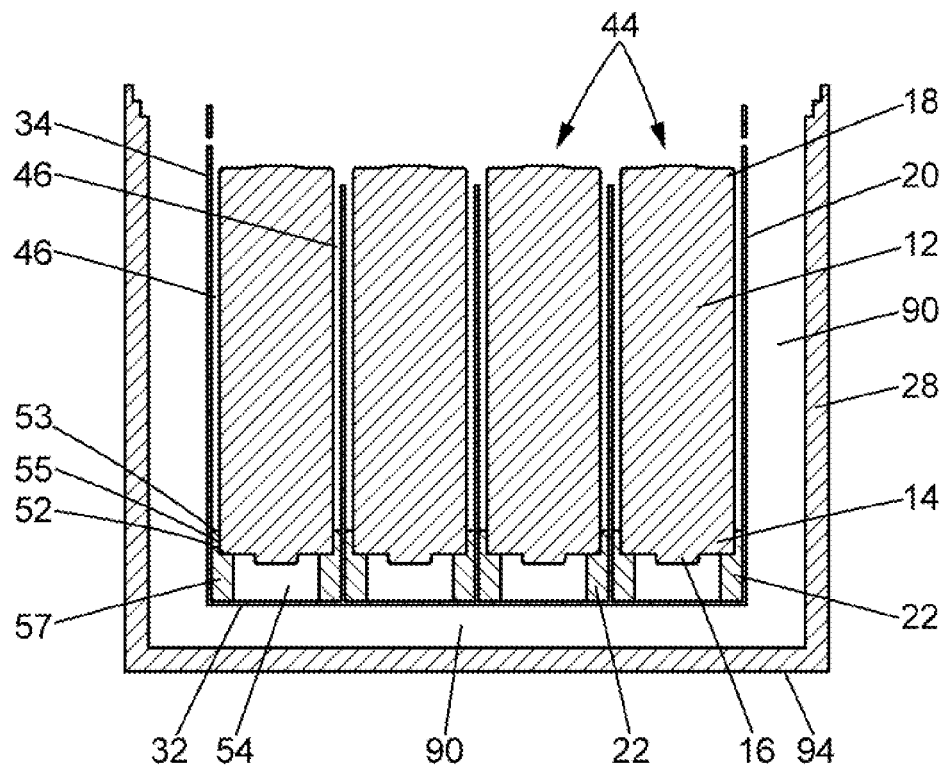
FIG. 5 is a section of the cell storage box along the section plane V-V shown in FIG. 3.
Figure 6:
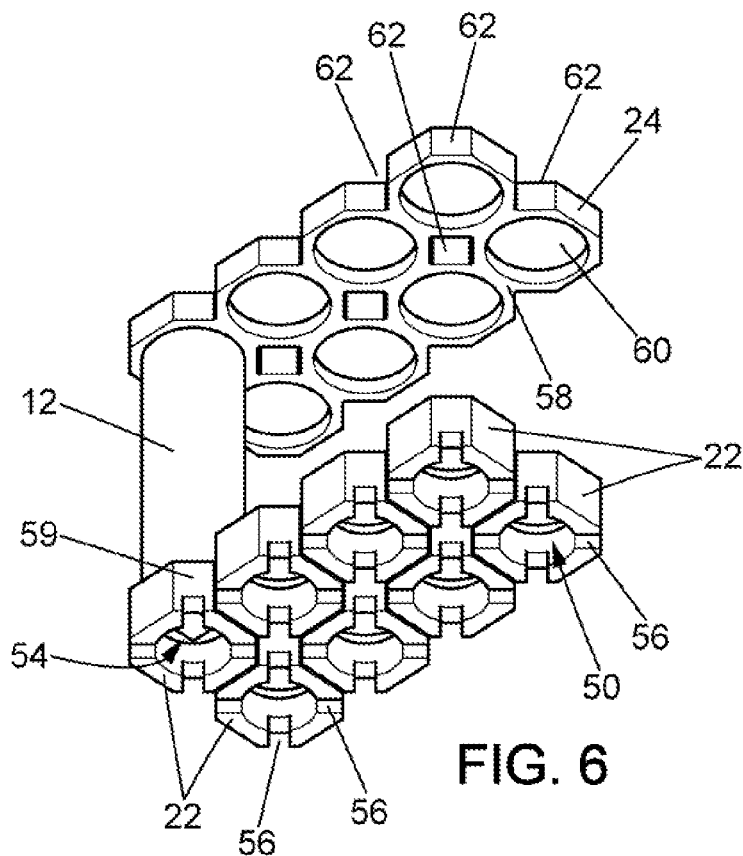
FIG. 6 is a bottom perspective view of a cell, eight cell supports and a locking plate according to the present invention.

As can be seen in FIGS. 4 to 6, the eight supports 22 are each arranged in a compartment 44 on the bottom wall 32 of the case. The eight supports 22 are identical. Just one support 22 is described in detail.

The support 22 has the general shape of a parallelepiped block. In particular, in the embodiment shown, the support 22 has the shape of a cubic block. It comprises an inner shoulder 52 raised above the bottom wall of the case 32, and at least one side bearing wall 55 suited to hold the battery away from the side walls 34 and/or away from the separating walls 42 of the housing. The support 22 also comprises a hollow lower cavity 54 able to collect liquid residues which could come out of the safety valve 16 in case of runaway of the cell.

In the embodiment shown, the support 22 comprises a central through opening 50 provided with the shoulder 52. The upper part 53 of the support located above the shoulder 52, has a circular shape complementarity to the shape of the cell 12. The walls of the upper part 53 of the support form the side bearing wall 55. This side bearing wall 55 extends perpendicularly to the shoulder 52. It is adjacent to the shoulder 55. The lower part 57 of the support located below the shoulder 52 forms the hollow lower cavity 54.

The shoulder 52 is intended to carry the first end 14 of the cell which is provided with the safety valve 16. The height H by which the shoulder 52 is raised relative to the bottom wall 32 is chosen such that the volume of the hollow lower cavity 54 is greater than the maximum volume of liquid residue which could escape from the cell. The height H is equal to at least 2 mm. Preferably, the height H is equal to at least 5 mm.

Since the shoulder 52 is raised by a height H, the liquid residues escaping through the safety valve 16 may release flows into the lower cavity 54 and collects on the bottom wall 32 with the compartment 44. Upon contact with the metal of the bottom wall 32, the liquid residues pool and solidify. The solidified residues are thus trapped in the lower cavity 54. Little oxygen has access to this lower cavity 54 because it is filled with smoke and gases. Since the liquid lithium residues are only in contact with a little oxygen, there is no propagation of flames outside the support 22.

The support 22 further comprises four openings 56 arranged below the shoulder 52. These openings 56 form passages between the hollow lower cavity 54 and the compartment 44. They allow smoke and gases leaving the safety valve 16 to escape during a runaway of the cell. In the embodiment shown, each opening 56 is located opposite a corner 49 of the compartment. Each opening 56 communicates with a second air gap 48 delimited by a corner 49 of the compartment 44 and a part of the support 22 arranged opposite the corner 49 of the compartment.

Preferably, the four vertical edges of the support 22 are truncated so as to form four oblique surfaces 59. The openings 56 open out onto the oblique surfaces 59. The clearance existing between the oblique surface 59 of the support and the walls of the compartment facilitate the escape of smoke and gases towards the second air gap 48. When the cells 12 have a cylindrical shape as in the example shown, the second air gaps 48 extend over the full height of each compartment between the corners 49 of the compartment 44 and circular portion of the cell 12.

Advantageously, the supports 22 are intended to carry the batteries 12 in order for them to be positioned in the center and away from the side walls 34 and the separating walls 42 of the case. Each support 22 serves to physically isolate a cell 12 from the case 20 and to create first 46 and second 48 air gaps extending around each cell. These first 46 and second 48 air gaps are going to allow the evacuation of smoke and gases which escape from the safety valve 16 and pass through the openings 56. These first 46 and second 48 air gaps are also thermal insulators.

As a variant, the eight supports 22 are attached to each other and constitute a single support. When this variant is used, the separating walls 42 are removable and are mounted above the single support and attached to each other.

The locking plate 24 has a rectangular shape. The lower surface 58 thereof comprises eight reinforcements 60 suited to receive the second end 18 of the cells. For this purpose, these reinforcements 60 have a complementary shape to the shape of the cell. In the example shown, they are circular. The locking plate 24 comprises through holes 62 suitable for smoke and gases to pass through during runaway of the cell. Preferably, these holes 62 are made above the second air gaps 48 delimited by the corners 49 of the compartments and a portion of the support. A single hole 62 is arranged opposite the adjacent corners 49 of various adjacent compartments 44. In that way, in the embodiment shown, five holes 62 are made equally spaced along each longitudinal edge of the locking plate and five other holes 62 are made equally spaced along a longitudinal median of the locking plate 24.

The eight supports 22 and the locking plate 24 are made of a thermally insulating and thermostable material, meaning highly heat resistant. This material is, for example, made of polyetherimide or polyphenylsulfone.

With reference to FIG. 2, the cover 26 comprises a main wall 64 and side walls 66. The main wall 64 has a rectangular shape. The main wall 64 has through holes 68 located above and opposite holes 62 in the locking plate. Thus these holes 68 are made above second air gaps 46.

The transverse edge of the main wall 64 comprises slits 70 suited to receive the tabs 40 of the case. When the cover 26 is placed on the case 20 and the tabs 40 pass through the slits 70 a portion of the tabs 70 is folded horizontally in order to secure the cover 26 to the case 20. The free longitudinal edges 72 of the side walls of the cover comprise fasteners 76 for the attachment of the cover 26 and the case 20 to the enclosure 28. The fasteners 76 are, for example, made up of blades 77 provided with an orifice 78 extending horizontally.

The enclosure 28 has a parallelepiped shape. It is open on the upper surface 80 thereof. It is for example molded of an insulating and thermostable plastic, for example highly resistant to heat, such as polyetherimide and polyphenylsulfone.

Figure 3:
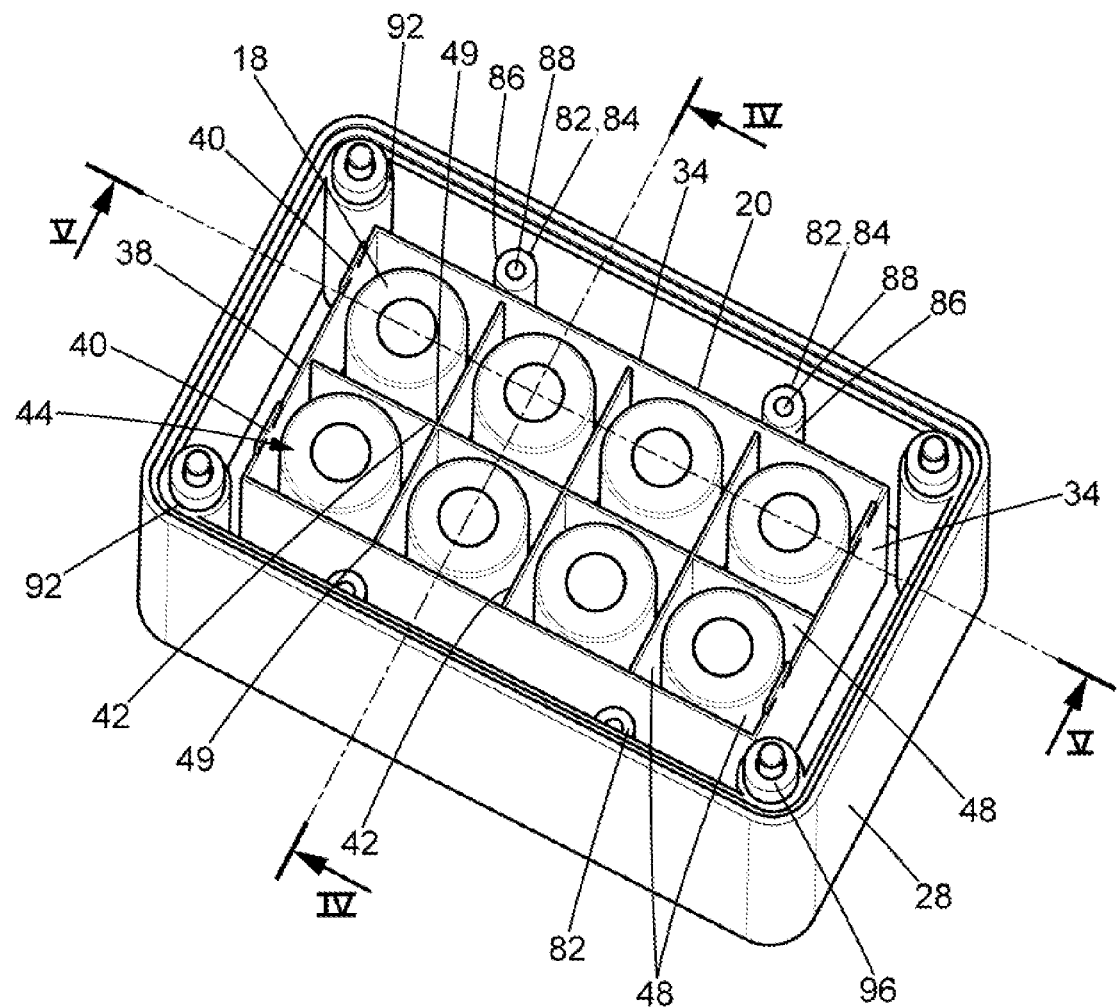
FIG. 3 is a top view of the cell storage box shown in FIG. 2.

Referring to FIGS. 2 and 3, the enclosure 28 comprises horizontal support walls 82 with which to carry the case 20 and the cover 26 suspended inside the enclosure 28. In the embodiment shown, the support walls 82 are the end walls 84 of vertical cylinders molded in a single unit with the enclosure 28. The vertical cylinders 86 are hollow and are positioned along each longitudinal face of the enclosure 28. The support walls 84 each comprise a threaded opening 88. Screw type attachment elements, not shown, are screwed into the openings 78 of the blades and into the threaded openings 88 of the support walls for attaching the cover 26 and the suspended case 20 thereof in the enclosure 28.

As can be seen in FIGS. 4 and 5, the enclosure forms a housing having inner dimensions greater than the outer dimensions of the case 20. Thus, a distance greater than 2 mm is provided between the enclosure 28 and the case 20. Preferably, this distance is equal to 5 mm. A third air gap 90 is thus arranged between the case 20 and the enclosure 28. This third air gap 90 is located on the side and under the case 20. The function of this third air gap 90 is to thermally insulate the case 20 from the enclosure 28.

The enclosure 28 further comprises, at each of the corners thereof, a hollow tube 92 having a lower-end opening onto the lower surface 94 of the enclosure and a threaded upper end 96. Screw type attachment elements 30 are arranged in the hollow tubes 92 and screwed into threads such that their threaded end is screwed into the complementary box 6 or into a top 7, such as shown in FIG. 7. The cylinders 86 and the tubes 92 are molded in a unit with the enclosure.

As a variant, the case 20 comprises tabs for attachment to the enclosure and the cover 26 does not comprise them.

With reference to FIGS. 7, the cell storage box 4 may also be covered by a top 7. When the storage box 4 is intended to contain just one cell 12, the case 20 does not comprise a separating wall 42. The inner dimension of the case 20 is larger than the dimension of one cell 12 so as to provide a first air gap 46 between the cell and the side walls 34 of the case.

As a variant, each support 22 comprises only one opening 56.

The hollow lower cavity 54 has a sufficient size for containing at least 80% of the solid and liquid residues which could leave the cell by the safety valve. In particular, the hollow lower cavity has a volume included between 3% and 25% of the volume of one cell. Generally, the hollow inner cavity has a volume included between 0.25 cm$^3$ to 2 cm$^3$. Thus, for example, for an AA type cell containing less than 1 g of lithium, the hollow inner cavity has a volume of 1 cm$^3$.

The complementary box 6 comprises openings connecting with the cell storage box 4. These openings are not shown on FIG. 1. These openings are arranged opposite the cell storage box. These openings have a surface area greater than 0.5 cm². The complementary box is suited to be attached above said cell storage box.

In particular the cell storage box connects with the complementary box via through holes 68 and via the third space 90. The complementary box is suited to be attached above said cell storage box. During runaway of the cell, smoke and gases leaving the cell go into the complementary box by passing through the first, second and third air gaps, the through holes 68, and by the openings of the complementary box.

The invention claimed is:

1. A cell storage box configured for storing at least one cell having a first end provided with a safety valve and a second end, said cell storage box comprising:
    a metal case comprising a bottom wall and side walls; and
    at least one thermally insulating support arranged in the metal case, wherein said at least one thermally insulating support comprises:
        a shoulder raised relative to the bottom wall of the metal case, such that the first end of the cell rests on said shoulder;
        at least one side bearing wall configured to rest against said at least one cell so as to keep the at least one cell at a first distance from at least one side wall of the side walls of the metal case, and wherein a first air gap is arranged between said at least one side wall of the side walls and said at least one cell;
        at least one opening arranged below the shoulder in order to allow smoke and gases leaving the safety valve to escape during a runaway of the cell; and
    an enclosure made of a thermally insulating material, wherein said enclosure forms a housing with inner dimensions greater than outer dimensions of the metal case; wherein said metal case is suspended in said housing by fasteners, wherein a third air gap is arranged between the enclosure and the metal case, and wherein the metal case is in contact with said enclosure solely via said fasteners.

2. The cell storage box according to claim 1, wherein the at least one thermally insulating support comprises a hollow lower cavity configured to receive a liquid residue coming from the safety valve during runaway of the cell.

3. The cell storage box according to claim 1, wherein said cell storage box comprises at least one metal separating wall positioned in the case, wherein said separating wall is configured to delimit at least two compartments, wherein said at least one thermally insulating support is configured to carry one cell in each of the at least two compartments, wherein the side bearing wall is configured to hold the at least one cell at a second distance from said at least one separating wall, and wherein the first air gap is arranged between the separating wall and the cell.

4. The cell storage box according to claim 3, further comprising a thermally insulating locking plate having at least one reinforcement configured to keep the second end of said at least one cell in position.

5. The cell storage box according to claim 4, wherein the thermally insulating locking plate comprises at least one hole through which smoke and gases can pass during a runaway of the cell.

6. The cell storage box according to claim 1, further comprising a metal cover provided with at least one hole through which smoke and gases can pass during runaway of the cell.

7. The cell storage box according to claim 5, further comprising at least one second air gap delimited by a corner of one of the at least two compartments and a part of the support arranged opposite the corner and in which at least one hole is made above said at least one second air gap.

8. The cell storage box according to claim 1, wherein said shoulder is located at a height above the bottom wall of the metal case, where the height is at least 2 mm.

9. An aircraft emergency location transmitter comprising the cell storage box according to claim 1, a complementary box configured to be attached to said cell storage box, an electronic circuit configured to generate a radiofrequency signal, and an antenna connected to the electronic circuit for transmitting an emergency location signal with the radiofrequency signal.

10. The emergency location transmitter of claim 9, wherein said complementary box is configured to be attached above said cell storage box, wherein the complementary box comprises openings connecting with the cell storage box.

* * * * *